(12) United States Patent
Kim et al.

(10) Patent No.: US 12,091,100 B2
(45) Date of Patent: Sep. 17, 2024

(54) LINK MECHANISM TYPE VARIABLE WHEEL DEFLECTOR AND VEHICLE HAVING THE SAME

(71) Applicants: HYUNDAI MOTOR COMPANY, Seoul (KR); KIA CORPORATION, Seoul (KR); SHINKI INTER-MOBIL CO., LTD, Busan (KR)

(72) Inventors: Tae-Hyung Kim, Incheon (KR); Hak-Lim Kim, Yongin-si (KR); Ji-Won Seo, Ansan-si (KR); Jung-Joong Lee, Suwon-si (KR); Jin-Woo Kim, Suwon-si (KR); Jung-Hoon Gil, Ansan-si (KR); Jong-Ho Jung, Ansan-si (KR); Sung-Sue Im, Ansan-si (KR)

(73) Assignees: HYUNDAI MOTOR COMPANY, Seoul (KR); KIA CORPORATION, Seoul (KR); SHINKI INTER-MOBIL CO., LTD, Busan (KR)

( * ) Notice: Subject to any disclaimer, the term of this patent is extended or adjusted under 35 U.S.C. 154(b) by 295 days.

(21) Appl. No.: 17/859,687

(22) Filed: Jul. 7, 2022

(65) Prior Publication Data
US 2023/0103296 A1 Apr. 6, 2023

(30) Foreign Application Priority Data
Oct. 5, 2021 (KR) .......................... 10-2021-0131546

(51) Int. Cl.
*B62D 35/00* (2006.01)
*B60R 19/00* (2006.01)
(Continued)

(52) U.S. Cl.
CPC .............. *B62D 37/02* (2013.01); *B60R 19/00* (2013.01); *B62D 35/005* (2013.01); *B62D 35/02* (2013.01); *B60R 2019/002* (2013.01)

(58) Field of Classification Search
CPC ....... B62D 35/005; B62D 35/02; B62D 37/02
See application file for complete search history.

(56) References Cited

U.S. PATENT DOCUMENTS

| 4,159,140 A * | 6/1979 | Chabot ................ B62D 35/005 |
| | | 296/180.5 |
| 2013/0057022 A1* | 3/2013 | Hoelzel ................ B62D 35/005 |
| | | 296/180.5 |

(Continued)

FOREIGN PATENT DOCUMENTS

| FR | 3103166 A1 * | 5/2021 | ........... B62D 35/005 |
| KR | 2010-0064996 A | 6/2010 | |

*Primary Examiner* — Gregory A Blankenship
(74) *Attorney, Agent, or Firm* — MCDONNELL BOEHNEN HULBERT & BERGHOFF LLP (57) ABSTRACT

According to a link mechanism type variable wheel deflector applied to a vehicle, a deflector coupled to a cover plate using a hinge boss as a rotation center can be operated using traveling resistant wind as a driving source, a piston receiving the linear movement of a link shaft by a moment arm rotated with the deflector can unfold the deflector while compressing an elastic member, and an elastic restoring force of the elastic member can be applied to the piston to return the link shaft and the moment arm to fold the deflector, thereby strengthening the repeated durability of the elastic member compared to the rotating motion of the spring, and in particular, the rotating motion and the linear motion can be implemented by the link motion mechanism apparatus connected to the deflector, thereby implementing the high durability performance with the low-cost mechanical structure.

20 Claims, 10 Drawing Sheets

(51) Int. Cl.
  *B62D 35/02* (2006.01)
  *B62D 37/02* (2006.01)

(56) References Cited

U.S. PATENT DOCUMENTS

| | | | |
|---|---|---|---|
| 2014/0175831 A1* | 6/2014 | Hoelzel | B62D 35/005 |
| | | | 296/180.5 |
| 2015/0175222 A1* | 6/2015 | Reuvekamp | B62D 35/005 |
| | | | 296/180.1 |
| 2015/0266522 A1* | 9/2015 | Ishikawa | B62D 35/005 |
| | | | 296/180.1 |
| 2019/0315415 A1* | 10/2019 | Pfister | B62D 37/02 |
| 2020/0010129 A1* | 1/2020 | Ikawa | B62D 37/02 |
| 2020/0307724 A1* | 10/2020 | Burrows | B62D 35/001 |
| 2023/0103296 A1* | 4/2023 | Kim | B60R 19/00 |
| | | | 296/180.1 |
| 2024/0051620 A1* | 2/2024 | Jeong | B62D 35/005 |
| 2024/0051623 A1* | 2/2024 | Tachi | B62D 35/02 |
| 2024/0132166 A1* | 4/2024 | Yoon | B62D 35/02 |

* cited by examiner

LINK MECHANISM TYPE VARIABLE WHEEL DEFLECTOR AND VEHICLE HAVING THE SAME

CROSS REFERENCE TO RELATED APPLICATIONS

This application claims priority to Korean Patent Application No. 10-2021-0131546, filed on Oct. 5, 2021, which is incorporated herein by reference in its entirety.

BACKGROUND

Field of the Disclosure

The present disclosure relates to a mechanism type variable wheel deflector, and in particular, to a vehicle to which a variable wheel deflector, which generates an elastic restoring force for folding by an unfolding operation of a deflector, thereby implementing a mechanical structure as a link mechanism type structure to strengthen the repeated durability, is applied.

Description of Related Art

In general, a wheel deflector of a vehicle is located on a wheel side, and is an accessory part that needs the harmony for the effect of improving aerodynamic performance, a method for preventing damage, the minimization of noise delivered to a rear seat, a sense of harmony with nearby parts, and securing an appearance quality, as the main considerations.

The wheel deflector is classified into an electric wheel deflector and a mechanical wheel deflector unfolded by the power of an actuator.

For example, the mechanical wheel deflector uses a torsional spring to implement a deflector mechanism, and connects a spring elastic force of the torsional spring with a traveling resistant wind generated at a constant vehicle speed or higher, and therefore, maintains the folding of the deflector if the spring elastic force is larger than the traveling resistant wind and switches to unfolding when the traveling resistant wind becomes larger than the spring elastic force.

Therefore, there are advantages in that the mechanical wheel deflector can secure the effects of improving aerodynamic performance while securing a sense of harmony with the nearby parts and the appearance quality in the external mounting condition of the vehicle, and these effects can be implemented at a low cost.

However, the mechanical wheel deflector has the advantage of having a simple structure and low cost compared to the electric wheel deflector, but has a structural limitation in that repetition durability is weak using the elastic force caused by the rotation of the torsional spring.

For example, the torsional spring can strengthen the weak repeated durability in nature by changing a structure of increasing the rigidity of the hinge connection elastic member, but this change in the structure also increases the resistance of the torsional spring against the wind pressure of the traveling wind, thereby delaying the unfolding time of the deflector.

In particular, if the deflector is operated with a delay at the time of unfolding, the wheel deflector cannot fulfill its basic function due to the reduced aerodynamic effect.

Furthermore, the structure of increasing the rigidity of the hinge connection elastic member inevitably has an aspect that it is not easy to implement the unfolding mechanism of the deflector due to the characteristics of the mechanical structure using the relationship between the traveling resistant wind and the intensity of the spring elasticity.

The contents described in Description of Related Art are to help the understanding of the background of the present disclosure, and may include what is not previously known to those skilled in the art to which the present disclosure pertains.

SUMMARY

Therefore, an object of the present disclosure considering the above point is to provide a link mechanism type variable wheel deflector and a vehicle having the same, which can convert the rotating motion of a deflector by traveling resistant wind into a linear motion that compresses an elastic member, thereby strengthening the repeated durability of the elastic member compared to the rotating motion of the spring, and in particular, implement the rotating motion and the linear motion with a link motion mechanism connected to the deflector, thereby implementing the high durability performance with a low-cost mechanical structure.

A link mechanism type variable wheel deflector according to the present disclosure for achieving the object includes a cover plate coupled to a vehicle front part, a deflector coupled to the cover plate using a hinge boss as a rotation center, and a link mechanism apparatus configured to convert a rotating motion in one side direction generated by unfolding the deflector by traveling resistant wind into a linear motion moving forward to store an elastic restoring force of an elastic member, and to convert the linear motion moving backward generated by the elastic restoring force larger than the traveling resistant wind into the rotating motion in the other side direction to fold the deflector to be in close contact with the cover plate.

In an exemplary embodiment, the rotating motion in one side direction forms a state where the deflector is perpendicular to the cover plate, and the rotating motion in the other side direction forms a state where the deflector is horizontal to the cover plate.

In an exemplary embodiment, the link mechanism apparatus is composed of a rotating motion link and a linear motion link, the rotating motion link is composed of a moment arm formed on a hinge body of the deflector to generate the rotating motion, and a link shaft moving together the moment arm, and the linear motion link is composed of a cylinder case in which a piston connected to the link shaft to generate the linear motion is embedded with the elastic member.

In an exemplary embodiment, the moment arm is formed with a long hole through which the link shaft penetrates, and a length of the long hole forms a linear movement distance of the piston connected to the link shaft.

In an exemplary embodiment, a plurality of the moment arms are formed along a width of the hinge body.

In an exemplary embodiment, the cylinder case is coupled to a case boss of the cover plate. The cylinder case is formed in a hollow structure of constraining the movement of the elastic member and the piston. As the elastic member, a compressing spring is applied.

In an exemplary embodiment, the linear motion link is composed of a left linear motion link and a right linear motion link, in which the left linear motion link supports a left portion of the deflector on a left portion of the cover plate, and the right linear motion link supports a right portion of the deflector on a right portion of the cover plate.

In an exemplary embodiment, the cover plate locates a hinge body of the deflector on a deflector channel, and the deflector channel forms the rotation center with a hinge groove into which the hinge boss is fitted.

In an exemplary embodiment, the cover plate and the deflector include a shock absorbing device, and the shock absorbing device is composed of a rubber bumper coupled to a cover body of the cover plate or a rotating damper coupled to the hinge boss of the deflector.

In an exemplary embodiment, the cover plate and the deflector include an anti-sagging device, and the anti-sagging device is composed of a permanent magnet coupled to a cover body of the cover plate and a deflector steel coupled to the deflector body of the deflector.

In an exemplary embodiment, the cover plate includes a pollutant blocking device, and the pollutant blocking device is composed of a protective cover coupled to a cover body of the cover plate, and covering a deflector channel of the cover plate, and a brush fixed to a channel step of the deflector channel, and contacting a hinge body of the deflector.

In an exemplary embodiment, the cover plate includes a traveling wind induction device, and the traveling wind induction device is composed of an undercover coupled to a cover body of the cover plate and a traveling wind gab formed by the cover body of the cover plate and the undercover to introduce traveling wind.

In addition, a vehicle according to the present disclosure for achieving the object includes a link mechanism type variable wheel deflector configured to operate a deflector coupled to a cover plate using a hinge boss as a rotation center using traveling resistant wind as a driving source, to unfold the deflector while compressing an elastic member of a piston receiving a linear movement of a link shaft by a moment arm rotated with the deflector, and to fold the deflector by applying an elastic restoring force of the elastic member to the piston to return the link shaft and the moment arm, and a vehicle front part mounted with the link mechanism type variable wheel deflector.

In an exemplary embodiment, the mounting portion of the link mechanism type variable wheel deflector is formed in front of a wheel.

In an exemplary embodiment, the link mechanism type variable wheel deflector includes one or more of a shock absorbing device configured to prevent the deflector from receiving an operational shock, an anti-sagging device configured to prevent the deflector from being sagged in a non-operation state, a pollutant blocking device configured to prevent the deflector from being polluted by foreign substances, and a traveling wind induction device configured to induce traveling wind to the deflector.

In an exemplary embodiment, the vehicle front part is a bumper.

The link mechanism type variable wheel deflector according to the present disclosure implements the following operations and effects.

First, it is possible to apply the link motion mechanism using the traveling resistant wind for the unfolding and folding of the deflector to the variable wheel deflector, thereby being implemented by the link mechanism type structure different from the conventional mechanical structure. Second, the link motion mechanism can be applied to the operation of the deflector again by converting the rotating motion into the linear motion to compress the elastic member, thereby improving the weakness of the repeated durability that is the disadvantage of the mechanical structure even while maintaining the inexpensive advantage of the mechanical structure.

Further, the vehicle according to the present disclosure to which the link mechanism type variable wheel deflector is applied implements the following operations and effects.

First, the link motion mechanism is operated on both left/right portions of the deflector to easily combine the shock absorbing structure, the anti-sagging structure, the pollutant blocking structure, and the traveling wind introduction structure, thereby easily improving the performance and merchantability of the variable wheel deflector. Second, it is possible to implement the shock absorbing structure by the rubber buffer or the rotating damper of the rotary shaft on the cover plate portion coupled to the deflector, thereby preventing the shock, the impact sound, etc. when the deflector is restored (i.e., folding). Third, it is possible to implement the anti-sagging structure using the permanent magnet of the cover plate and the steel structure of the deflector, thereby preventing the deflector from being sagged by the speed bump in the low-speed section by the attraction operation of the permanent magnet against the steel. Fourth, it is possible to implement the pollutant blocking structure using the brush between the additional protection cover using the cover plate and the rotating gab, thereby preventing the pollutant from flowing into the deflector and the nearby portions. Fifth, the traveling wind introduction structure can form the deflector and the traveling wind introduction gab as the undercover of the vehicle, thereby unfolding the deflector without separate bending shape by the traveling resistant wind through the gab.

DETAILED DESCRIPTION

Hereinafter, an exemplary embodiment of the present disclosure will be described in detail with reference to the accompanying exemplary drawings, and the exemplary embodiment is one example and can be implemented by those skilled in the art to which the present disclosure pertains in various different forms, and therefore, is not limited to the exemplary embodiment described herein.

Figure 1:
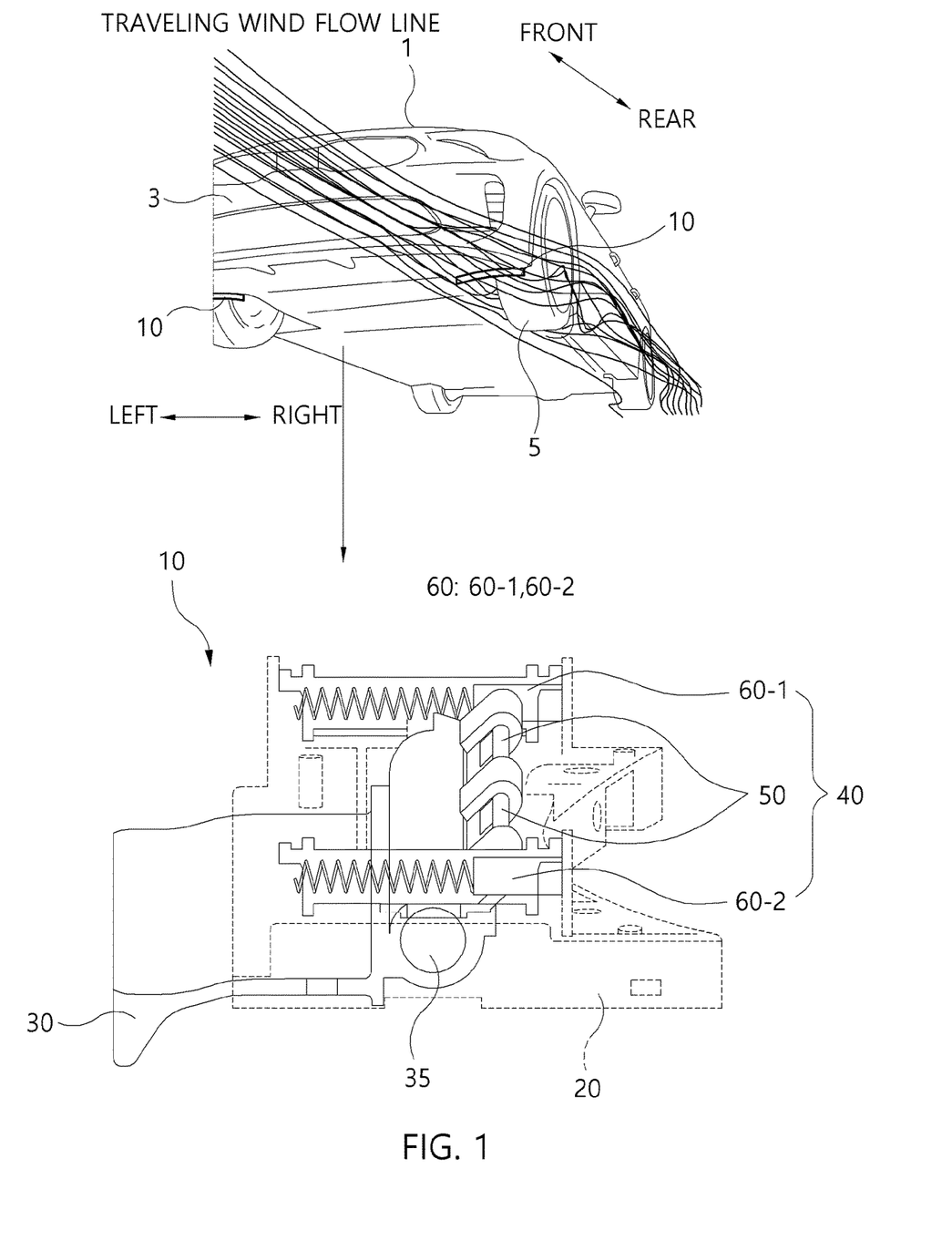
FIG. 1 is a configuration diagram of a link mechanism type variable wheel deflector applied to a vehicle according to the present disclosure.

Referring to FIG. 1, a variable wheel deflector 10 applied to a vehicle 1 is located on a lower portion of a vehicle front part 3 in front of a wheel 5 to receive traveling resistant wind generated by traveling wind passing through the vehicle front part 3 and a side surface of the wheel 5 under the vehicle front part 3. In this case, the vehicle front part 3 can be a front bumper.

Therefore, the variable wheel deflector 10 is characterized by one type of a speed sensitive-type variable wheel deflector that unfolds a deflector 30 with the traveling resistant wind increased by an increase in a traveling speed of the vehicle 1 together, thereby improving an aerodynamic of the vehicle. In this case, the traveling wind is generated depending upon the vehicle traveling or the natural environments to serve as a driving source that unfolds the deflector 30.

Specifically, the variable wheel deflector 10 is composed of a cover plate 20, the deflector 30, and a link mechanism apparatus 40.

For example, the cover plate 20 forms a structure integrated with the vehicle front part 3 assembled on the lower portion of the vehicle front part 3, and serves as a main housing in which the deflector 30 and components of the link mechanism apparatus 40 are assembled. In this case, the cover plate 20 can be manufactured by a separate panel part, or a partial part of the vehicle front part 3 or a partial part of a bumper.

For example, the deflector 30 is formed with a rotary shaft for an unfolding operation with a hinge boss 35 (see FIGS. 2 and 3) coupled to a hinge groove 24 of the cover plate 20, and is rotated from 0° (i.e., folding) to 90° (i.e., unfolding) depending upon the intensity of the traveling resistant wind applied to a deflector body 31 of the deflector 30 (see FIGS. 2 and 3) using the rotary shaft as the rotation center.

For example, the link mechanism apparatus 40 is composed of a rotating motion link 50 and a linear motion link 60, and in particular, the linear motion link 60 is composed of a pair of left/right linear motion links 60-1, 60-2. In this case, the left linear motion link 60-1 supports a left portion of the deflector 30 on a left portion of the cover plate 20, and the right linear motion link 60-2 supports a right portion of the deflector 30 on a right portion of the cover plate 20, thereby performing an operation of the wind pressure utilization motion conversion mechanism more stably.

Figure 2:
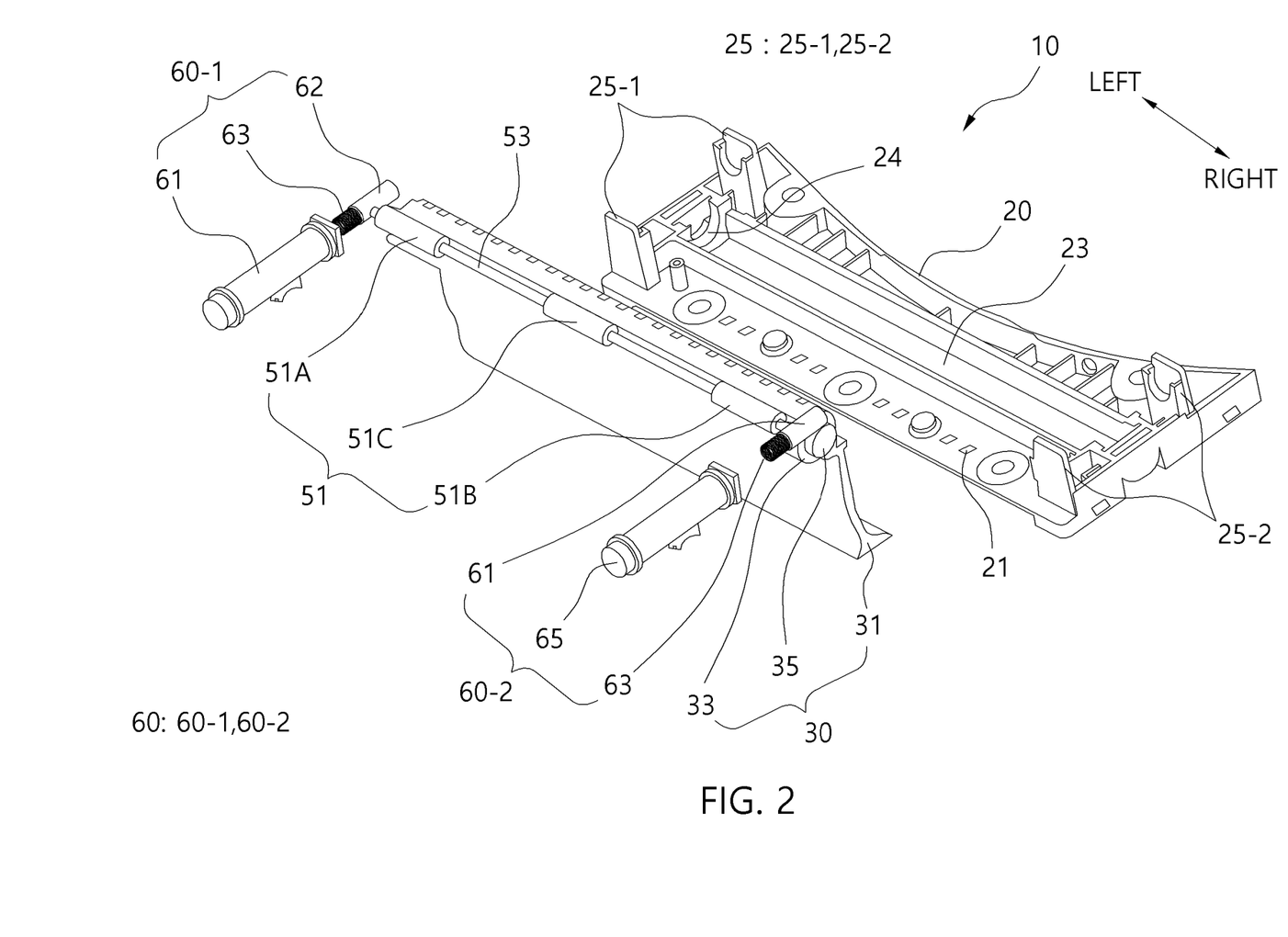
FIG. 2 is an exploded perspective diagram of the link mechanism type variable wheel deflector according to the present disclosure.
Figure 3:
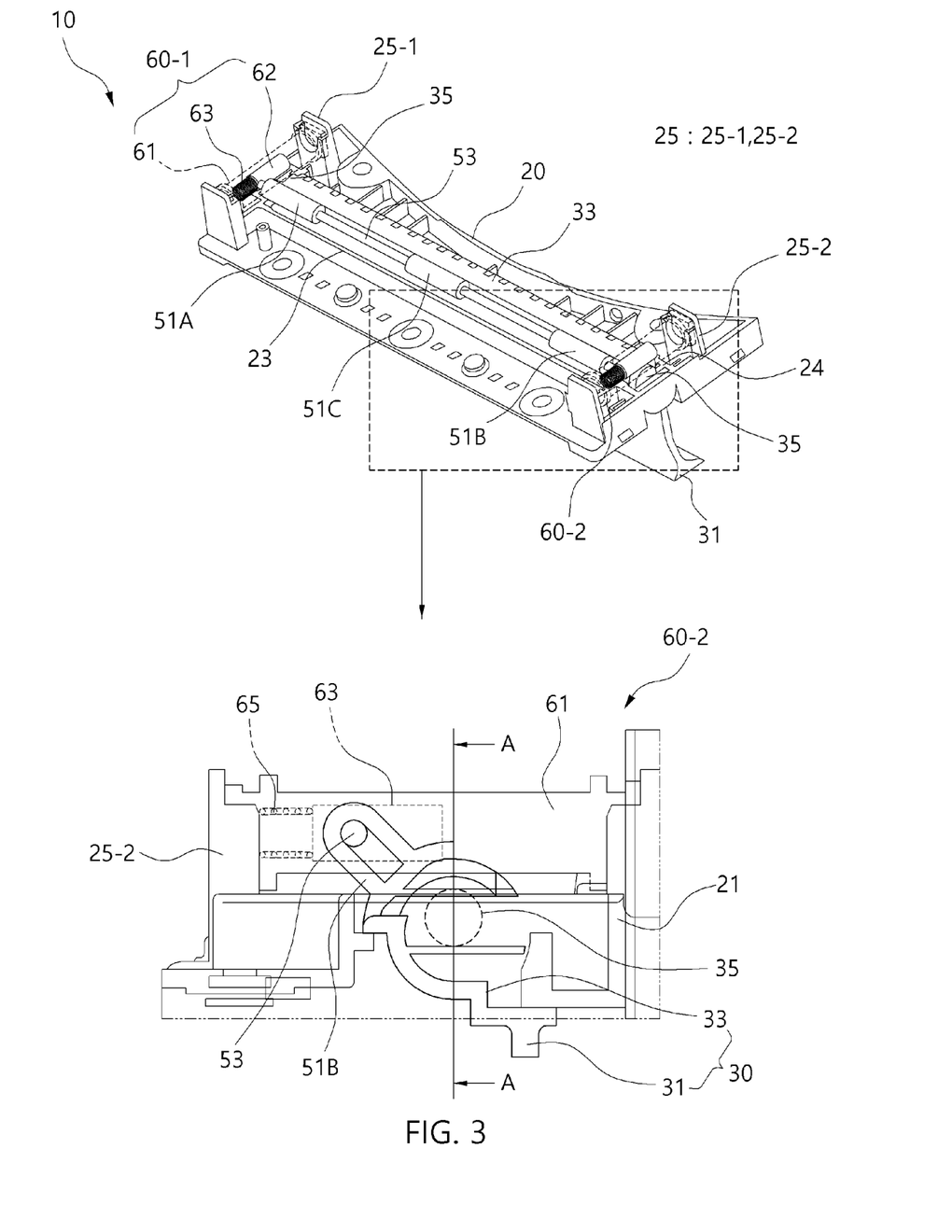
FIG. 3 is a diagram showing an assembling state of the link mechanism type variable wheel deflector according to the present disclosure.

Meanwhile, FIGS. 2 and 3 show a connection structurability between the cover plate 20, the deflector 30, and the link mechanism apparatus 40 through exploded and assembling perspective diagrams of the variable wheel deflector 10.

Referring to FIGS. 2 and 3, as shown in FIG. 2, the cover plate 20 and the deflector 30 are manufactured by separated parts, respectively, and as shown in FIG. 3, the cover plate 20 and both left/right portions of the deflector 30 form the rotary shaft by coupling the hinge groove 24 to the hinge boss 35, and therefore, the deflector 30 can be operated in a range of the rotating motion from 0° to 90°.

In addition, as shown in FIG. 2, in the link mechanism apparatus 40, the rotating motion link 50 and the linear motion link 60 are manufactured by separate parts, respectively, and as shown in FIG. 2, the rotating motion link 50 and the linear motion link 60 are connected to a link shaft 53 and a piston 63 so that the rotating motion and the linear motion can be interchanged.

In particular, as shown in FIG. 2, the rotating motion link 50 is formed with a moment arm 51 in a structure of being integrated with a hinge body 33 of the deflector 30 to be integrated with the deflector 30, and as shown in FIG. 3, the linear motion link 60 is coupled to a case boss 25 of the cover plate 20 to be integrated with the cover plate 20.

Specifically, the cover plate 20 is composed of a cover body 21, a deflector channel 23, the hinge groove 24, and the case boss 25, and manufactured by an injected structure.

For example, the cover body 21 allows the entire shape of the cover plate 20 to be formed in a rectangular shape, the deflector channel 23 is perforated in a width direction (i.e., left/right directions) in an intermediate section of the cover body 21 to form an opening space into which the deflector 30 is inserted, the hinge groove 24 is formed in a recess structure on a sidewall of the deflector channel 23 so that the hinge boss 35 of the deflector 30 is fitted therein, and the case boss 25 is formed in a structure of protruding from the sidewall of the cover body 21 so that the linear motion link 60 is fitted therein and fixed thereto.

In particular, the hinge groove 24 is formed on both left/right sidewalls of the deflector channel 123 so that each of the hinge bosses 35 formed on both left/right of the deflector 30 is fitted therein.

In addition, the case boss 25 is composed of a pair of left/right case bosses 25-1, 25-2, in which the left case boss 25-1 is formed as a sidewall of the protruding structure at the left of the cover body 21 of the cover plate 20, the right case boss 25-2 is formed as a sidewall of the protruding structure at the right of the cover body 21 of the cover plate 20, and the left/right sidewalls of the protruding structure form protruding partition walls in the front and rear direction, so that a cylinder case 61 of the linear motion link 60 forms a fixed state through the coupling.

Specifically, the deflector 30 is composed of the deflector body 31, the hinge body 33, and the hinge boss 35, and manufactured by an injected structure.

For example, the deflector body 31 is formed in a rectangular shape so that the traveling resistant wind acts at a stronger intensity, the hinge body 33 forms an upper portion of the deflector body 31 in an approximately circular cross-sectional structure, and the hinge boss 35 is formed of left/right protruding projections of the hinge body 33 and therefore, fitted into the hinge groove 24 formed in a recess structure of the left/right sidewalls on the deflector channel 23 of the cover plate 20 to serve as a hinge shaft of the rotating motion.

Specifically, the rotating motion link 50 of the link mechanism apparatus 40 is composed of the moment arm 51 and the link shaft 53, and the linear motion link 60 is composed of the cylinder case 61, the piston 63, and the elastic member 65. In this case, the linear motion link 60 is composed of a pair of left/right linear motion links 60-1, 60-2, and each of the left/right linear motion links 60-1, 60-2 has the same components, including the cylinder case 61, the piston 63, and the elastic member 65.

For example, the moment arm 51 is formed in a structure of protruding from the hinge body 33 of the deflector 30 to form a structure integrated with the deflector 30, and the link shaft 53 is formed of a rod bar with a length larger than a width of the deflector body 31, and therefore, both left/right edge portions are fixed to the piston 63 in a state of penetrating the moment arm 51.

In particular, the moment arm 51 is formed to have a moment length in a long-hole shape with respect to the piston 63, the long hole provides a space where the link shaft 53 is fitted into and penetrates the moment arm 51, and the moment length forms a linear movement distance of the piston 63 at which the elastic member 65 of the linear motion link 60 is compressed and deformed by the link shaft 53 when the deflector 30 is unfolded. In this case, a diameter of the link shaft 53 is formed to be equal to or slightly smaller than the width of the long hole.

Therefore, the link shaft 53 connects the linear direction force through the piston 63 generated by restoring the elastic member 65 to the rotation direction force of the moment arm 51 while connecting a rotating direction force through the moment art 51 generated by unfolding the deflector 30 to the linear direction force of the piston 63.

In addition, the moment arm 51 is composed of left/right moment arms 51A, 51B and a center moment arm 51C, and therefore, the link shaft 53 can form the coupling state more stably with three supporting portions in the entire width section of the deflector 30. In this case, the left moment arm 51A protrudes from a left edge portion of the hinge body 33, the right moment arm 51B protrudes from a right edge portion of the hinge body 33, and the center moment arm 51C protrudes from an intermediate portion between the left and right of the hinge body 33.

For example, the cylinder case 61 is formed in a hollow structure of accommodating the piston 63 while elastically supporting the elastic member 65 on one edge thereof, and serves to provide an antifouling property for the piston 63 and the elastic member 65 and to regulate a location of the linear motion of the piston 63 by the link shaft 53. To this end, the cylinder case 61 forms a projection structure or a step structure of closely contacting and being coupled to a groove or a partition wall formed on the case boss 25 of the plate 20 on the outside of the case.

In particular, the cylinder case 61 is formed with a linear slot (not shown) recessed in an outer diameter of the case, and the linear slot forms a movement distance at which the piston 63 is linearly moved in a state where the link shaft 53 connected to the piston 63 is fitted.

For example, the piston 63 is accommodated in the cylinder case 61, and linearly moved forward through the link shaft 53 in a state of being connected to the link shaft 53 fitted into the linear slot of the cylinder case 61 to compress and deform the elastic member 65, and linearly moved backward by restoring the elastic member 65 to return the link shaft 53 to an initial location.

For example, the elastic member 65 serves as a return driving source that is accommodated in the cylinder case 61 to be elastically supported, and compressed and deformed by a pressurization force (i.e., linear direction force) due to the forward linear movement of the piston 63 and then pushes the piston 63 to linearly move backward at the time when the elastic restoring force is larger than the pressurization force of the piston 63. In this case, as the elastic member 65, a coil spring (i.e., compressing spring) is applied, but if necessary, a plate spring having one end fixed to the inside of the cylinder case 61 can be applied.

Figure 4:
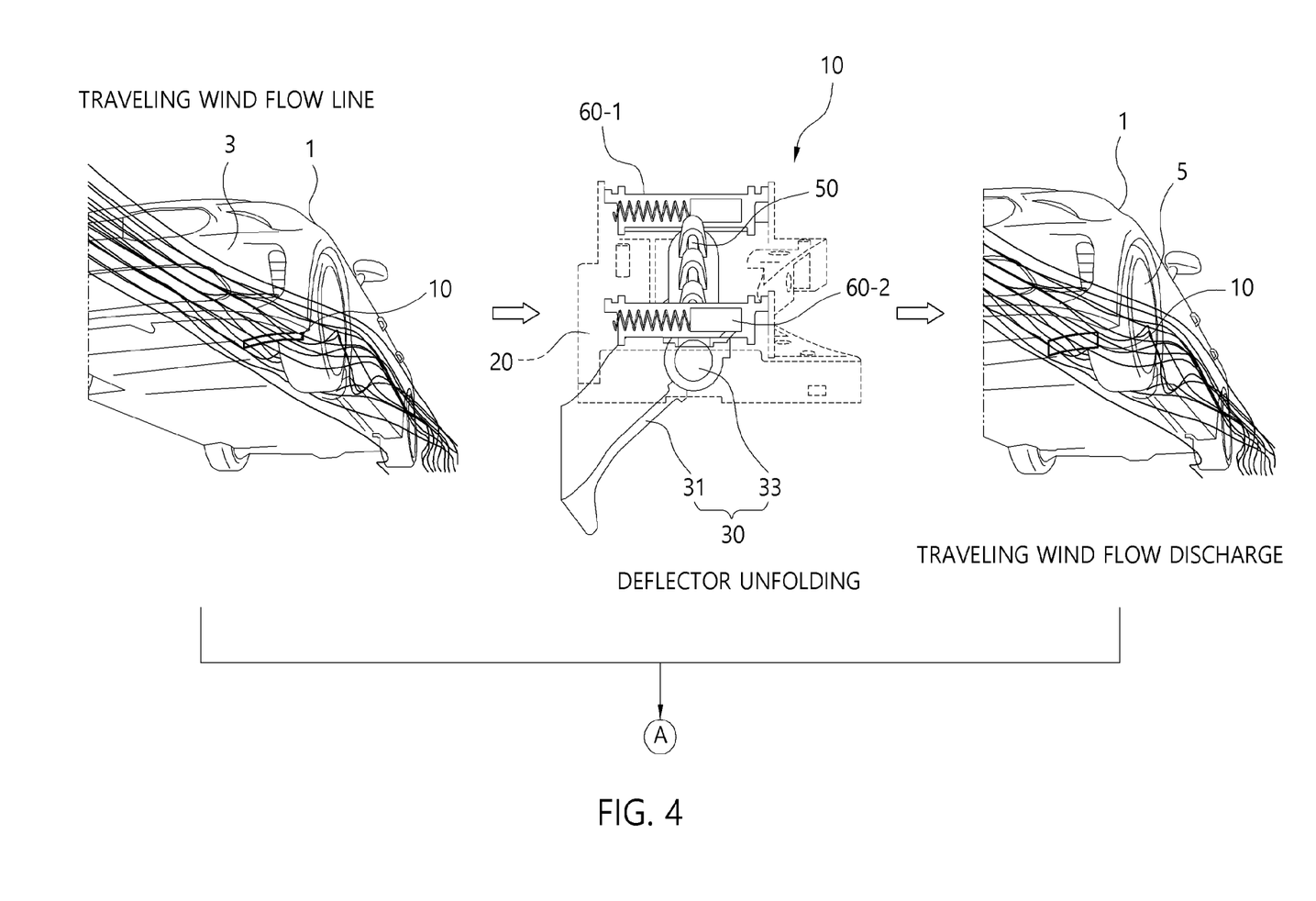
FIG. 4 is a diagram showing an operation state of a wind pressure utilization motion conversion mechanism that operates a rotating motion link and a linear motion link of a link mechanism apparatus according to the present disclosure.
Figure 5A:
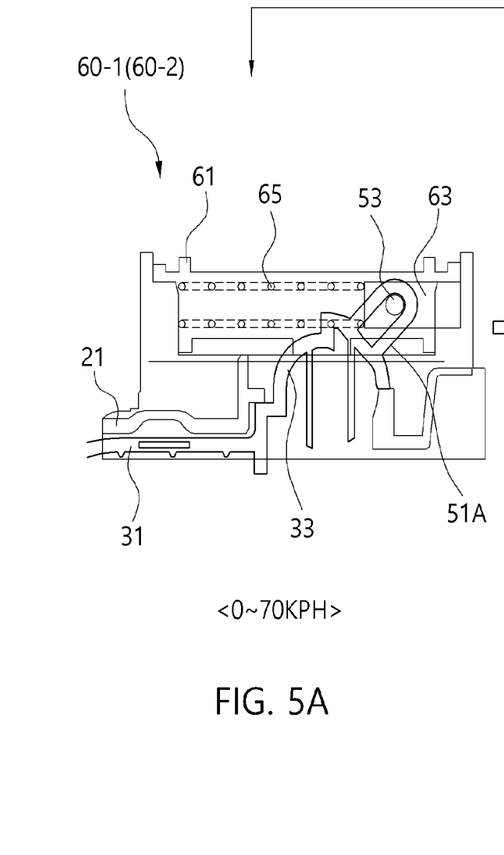
FIGS. 5A, 5B, 5C, and 6 are diagrams showing a state where the link mechanism type variable wheel deflector according to the present disclosure is unfolded at a traveling speed of a vehicle.
Figure 5B:
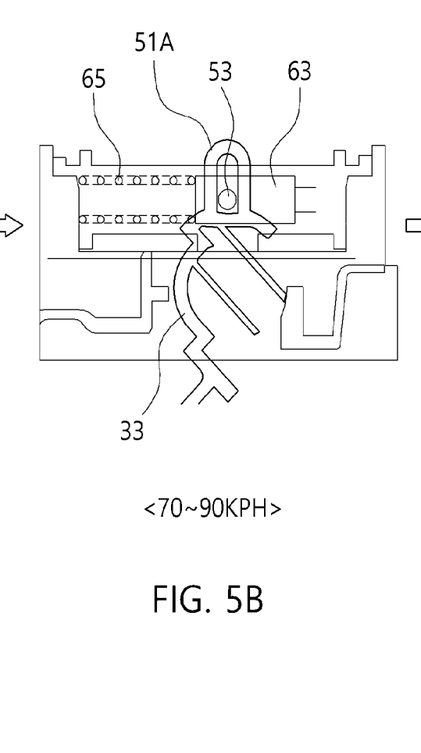
Figure 5C:
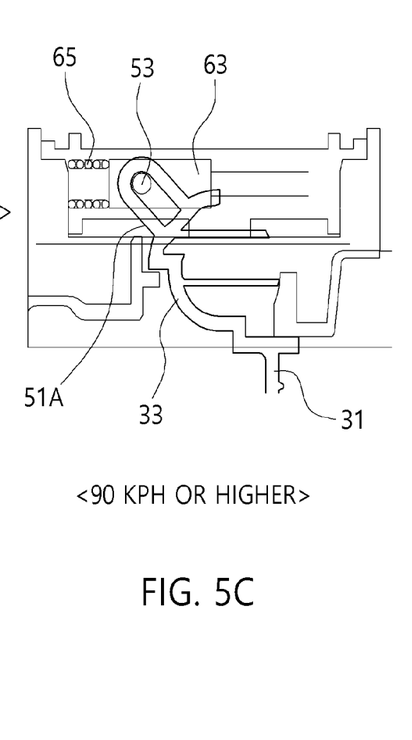
Figure 6:
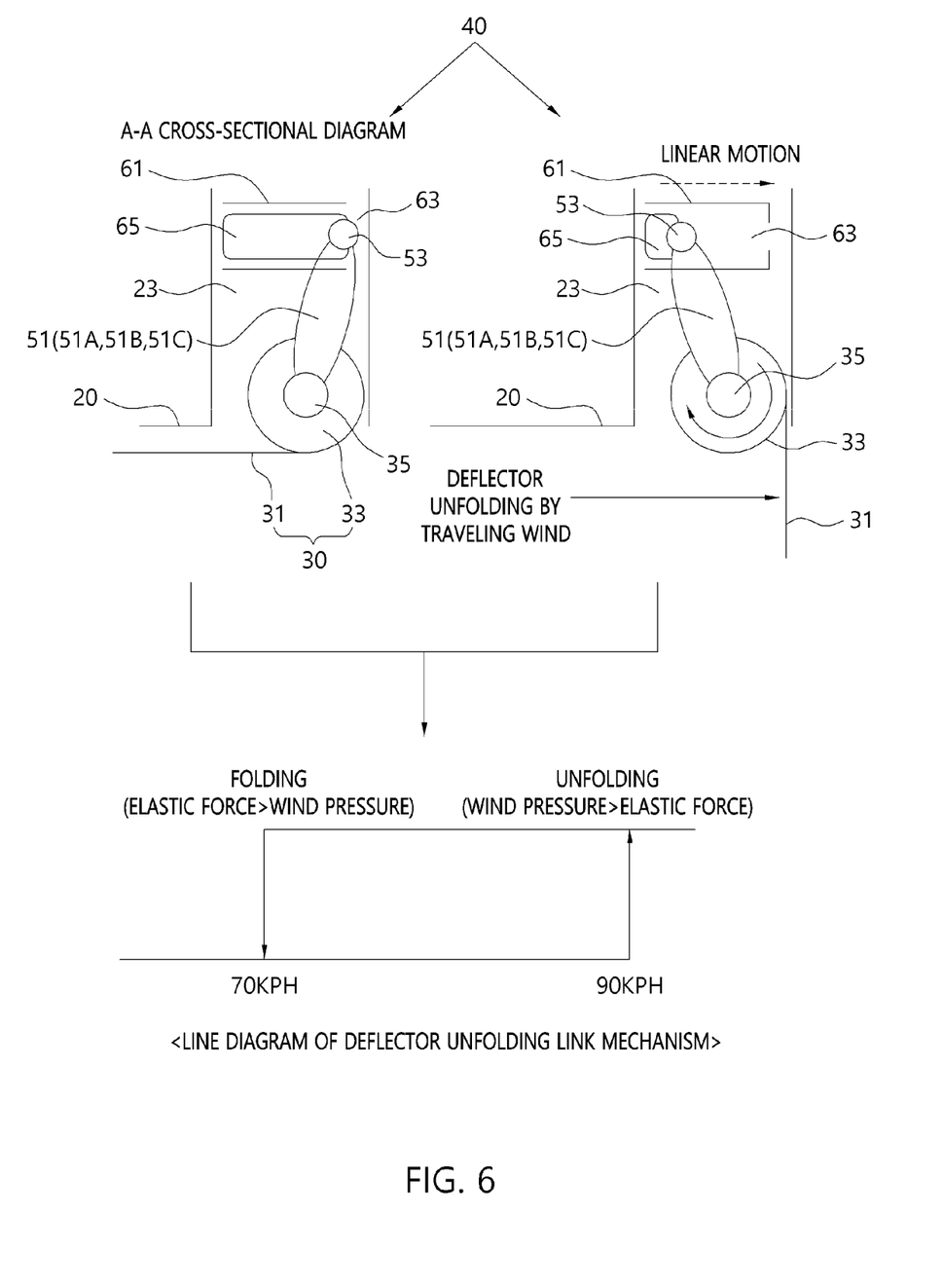

Meanwhile, FIGS. 4 to 6 show the operation states of the link mechanism apparatus 40, and show that the rotating motion link 50 and the linear motion link 60 are operated by the wind pressure utilization motion conversion mechanism using the traveling resistant wind as the driving source and therefore, any mechanical power (i.e., actuator) is not used for the operation of the deflector 30.

Referring to FIG. 4, the variable wheel deflector 10 forms a state where the deflector is unfolded due to an increase in the traveling resistant wind caused by an increase in a vehicle speed between the flows of introduction and discharge of the traveling wind formed from the vehicle front part 30 along the side surface of the wheel 5 while the vehicle 1 travels.

Referring to FIG. 5, the state where the deflector is unfolded can be classified into a deflector initial state (FIG. 5A) of setting the vehicle speed of 0 to 70 KPH or lower as a low-speed traveling, a deflector intermediate state (FIG. 5B) of setting the vehicle speed of 70 to 90 KPH as the low-speed traveling, and a deflector operation state (FIG. 5C) of setting the vehicle speed of 90 KPH or higher as the low-speed traveling. In this case, since the deflector 30 has a changed size of the wind pressure depending upon the wind pressure area, the vehicle speeds of 0 to 70 KPH, 70 to 90 KPH, and 90 KPH or higher that are the exemplified vehicle speed region are only one setting example and the unfolding operation of the deflector 30 is not specified by these values.

Therefore, the state where the deflector is unfolded is changed into the deflector initial state (FIG. 5A)<-> the deflector intermediate state (FIG. 5B)<-> the deflector operation state (FIG. 5C) depending upon the traveling speed of the vehicle 1. In this case, the "<->" refers to the interchange of the operation.

For example, in the deflector initial state (FIG. 5A), the moment arm 51A and the link shaft 53 of the rotating motion link 50, and the piston 63 of the linear motion link 60 are moved backward as much as possible, and therefore, the elastic member 65 is not compressed and deformed, and the deflector 30 is in close contact with the cover body 21 of the cover plate 20 in a state of being folded (i.e., unfolded at 0°). On the other hand, in the deflector operation state (FOG. 5C), the moment arm 51A and the link shaft 53 of the rotating motion link 50 and the piston 63 of the linear motion link 60 are moved forward as much as possible, and therefore, the elastic member 65 is compressed and deformed, and the deflector 30 stands upright with respect to the cover body 21 of the cover plate 20 in a state where the deflector is unfolded (i.e., unfolded at 90°).

Therefore, the deflector intermediate state (FIG. 5B) is an intermediate process between the deflector initial state (FIG. 5A) and the deflector operation state (FIG. 5C), and the deflector 30 stands at the forward inclination with respect to the cover body 21 of the cover plate 20 in a state of being half-unfolded (i.e., unfolded at 45°).

Referring to FIG. 6, the interlocking structure of the rotating motion link 50 and the linear motion link 60 maintains the deflector initial state (FIG. 5A) where the moment arm 51 and the piston 63 are moved backward as much as possible in the unfolded state (i.e., state of being unfolded at 0°) of the deflector 30 when the vehicle 1 travels at a low speed at which the vehicle speed is 70 KPH or lower, and the link shaft 53 connecting the moment arm 51 and the piston 63 are moved backward as much as possible in the deflector initial state (FIG. 5A).

Therefore, in the deflector initial state (FIG. 5A), the spring elastic force of the elastic member 65 acts as a force larger than the traveling resistant wind.

Then, when the vehicle 1 is switched to the deflector operation state (FIG. 5C) by increasing the vehicle speed at a high speed traveling of 90 KPH or higher, the moment arm 51 of the rotating motion link 50 is rotated in one side direction together with the hinge body 33 using the hinge boss 35 of the deflector 30 as the rotation axis in the process of unfolding the deflector 30, and the rotation of the moment arm 51 in one side direction linearly moves forward the link shaft 53 of the rotating motion link 50. Here, the rotation in one side direction can be defined as a counterclockwise rotation, and the rotation in the other side direction can be defined as a clockwise rotation.

As described above, the rotating motion link 50 generates the linear motion of the link shaft 53 with the rotating motion of the moment arm 51 while the deflector 30 is unfolded from 0° to 90° using the hinge boss 35 as the rotation axis. Then, the piston 63 of the linear motion link 60 is linearly moved forward together with the link shaft 53 and therefore, the elastic member 65 is compressed and deformed by being compressed by the pressurization force of the piston 63 to store the elastic force. In this case, in the unfolded state, the traveling resistant wind acts as a force larger than the spring elastic force of the elastic member 65.

Therefore, the deflector 30 stands upright in the deflector operation state (FIG. 5C) to change the flows of introduction and discharge of the traveling wind formed from the vehicle front part 30 along the side surface of the wheel 5, and this change in the flow of the traveling wind improves the aerodynamic of the vehicle that travels at a high speed above 90 KPH.

Thereafter, if the vehicle 1 is switched to the low-speed traveling in which the vehicle speed is reduced from 90 KPH to 70 KPH, the deflector operation state (FIG. 5C) is switched back into the deflector initial state (FIG. 5A) through the deflector intermediate state (FIG. 5B), and therefore, the operation of the linear motion link 60 of the rotating motion link 50 according to the process is omitted.

As described above, the link mechanism apparatus 40 implements the wind pressure utilization motion conversion mechanism that generates the rotating motion of the rotating motion link 50 using the traveling resistant wind as the driving source and the linear motion of the linear motion link 60 using the elastic force as the driving source, and the wind pressure utilization motion conversion mechanism converts the rotating motion by the unfolding operation (i.e., unfolding) of the deflector 30 into the elastic force and then converts the elastic force into the linear motion to implement the folding operation (i.e., folding) of the deflector 30, thereby implementing the link mechanism type variable wheel deflector 10 capable of the low cost and high durability performance without a separate actuator power.

Meanwhile, FIGS. 7 to 10 show the shock absorbing structure, the anti-sagging structure, the pollutant blocking structure, and the traveling wind induction structure applied to the link mechanism type variable wheel deflector 10, respectively.

Figure 7:
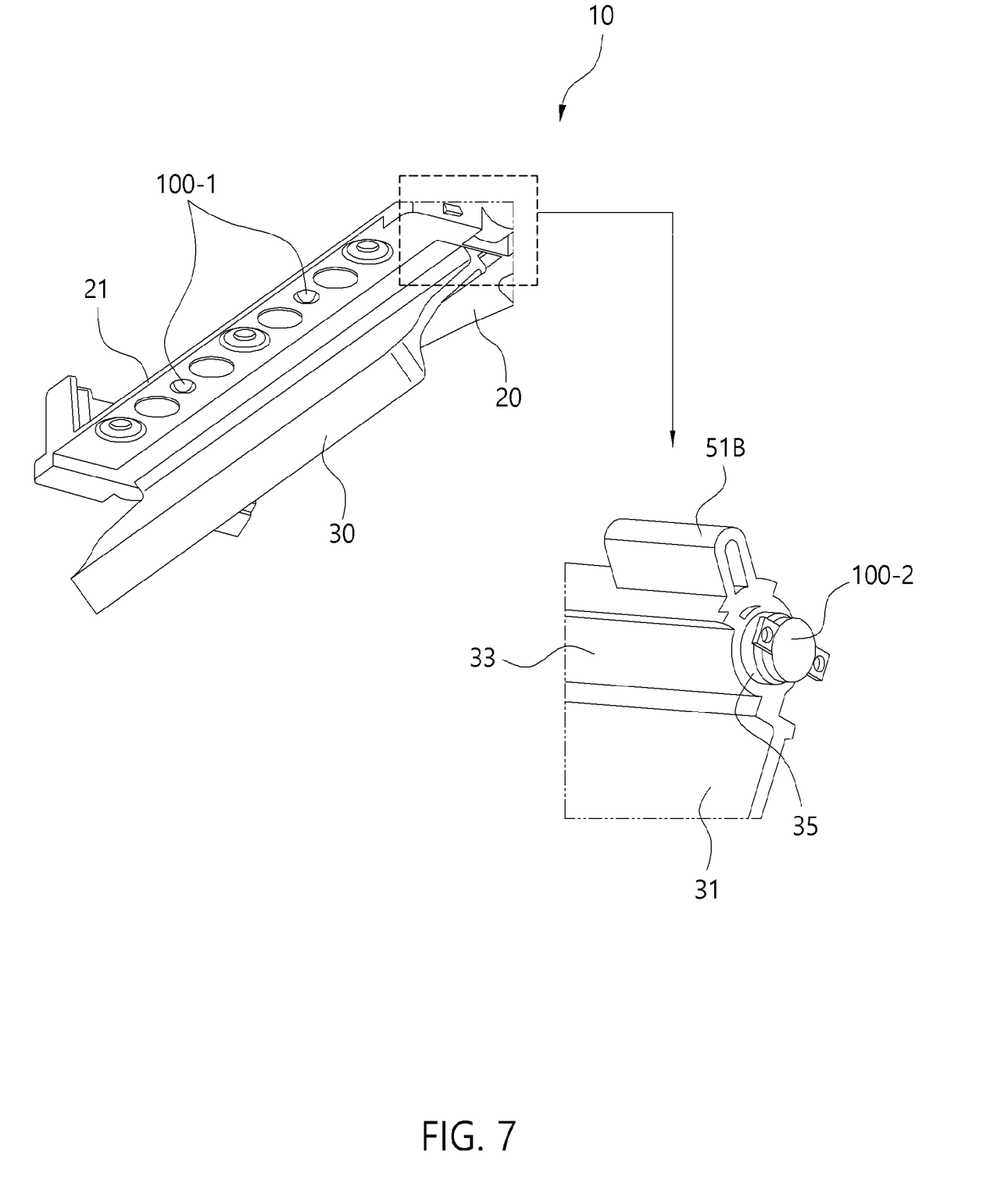
FIG. 7 is a diagram showing an example in which a shock absorbing structure is applied to the link mechanism type variable wheel deflector according to the present disclosure.

Referring to FIG. 7, the shock absorbing structure is implemented as a shock absorbing device 100, and the shock absorbing device 100 includes a rubber bumper 100-1 and/or a rotating damper 100-2.

For example, a plurality of rubber bumpers 100-1 are formed, and are fitted into a plurality of holes perforated at regular intervals in the cover body 21 of the cover plate 20, respectively, thereby absorbing and alleviating the shock due to the contact between the deflector body 31 and the cover body 21 when the deflector 30 is folded.

For example, the rotating damper 100-2 is fitted into a hole perforated in the hinge boss 35 of the deflector 30 and coupled to the hinge body 33, thereby absorbing and alleviating the shock due to the contact between the hinge boss 35 and the hinge groove 24 when the deflector 30 is folded and unfolded.

Therefore, the shock absorbing device 100 prevents the shock, the impact sound, etc. when the deflector 30 is restored.

Figure 8:
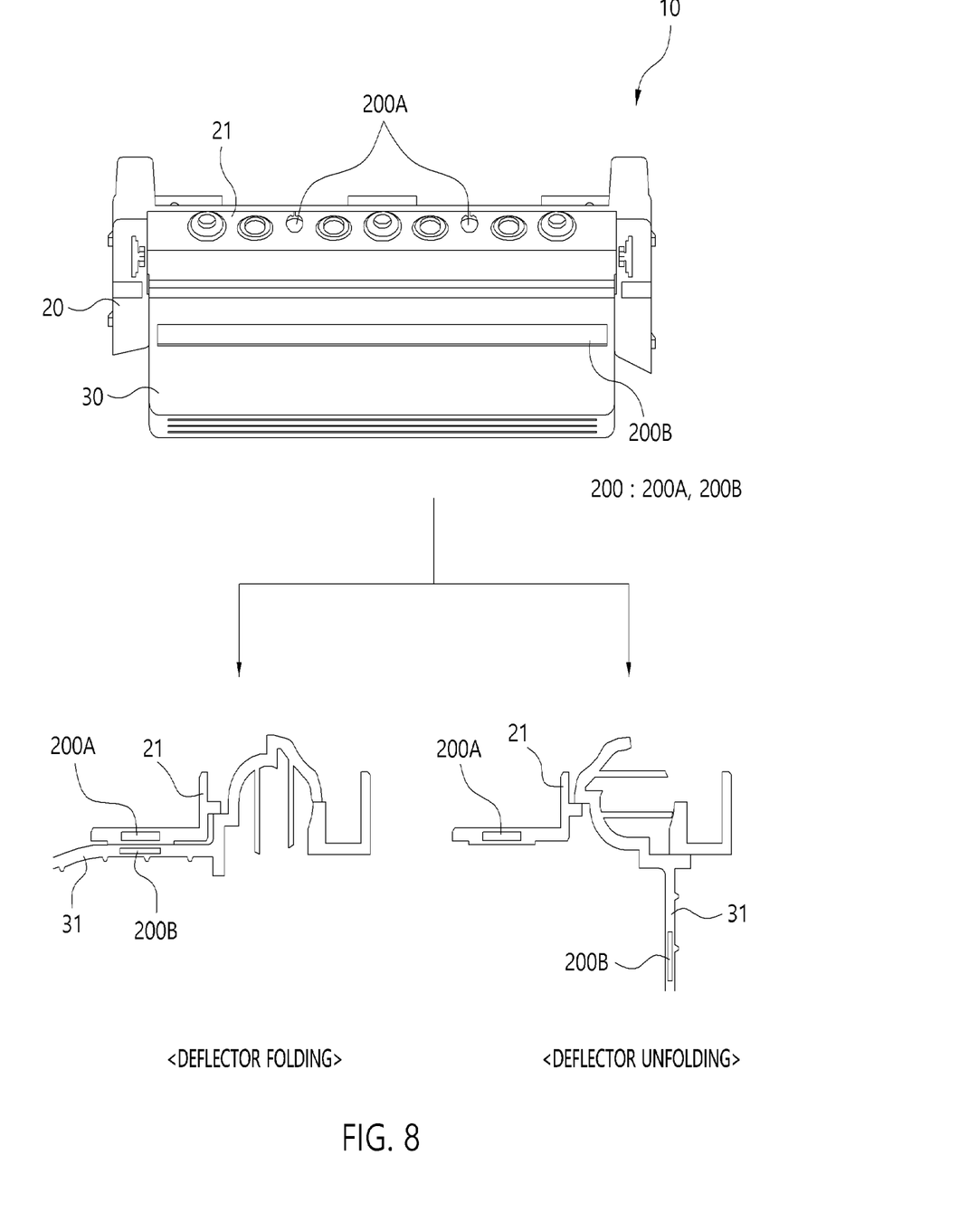
FIG. 8 is a diagram showing an example in which an anti-sagging structure is applied to the link mechanism type variable wheel deflector according to the present disclosure.

Referring to FIG. 8, the anti-sagging structure is implemented as an anti-sagging device 200, and the anti-sagging device 200 is composed of a permanent magnet 200A and a deflector steel 200B.

For example, a plurality of permanent magnets 200A are formed, and embedded in and integrated with the cover body 21 of the cover plate 20 at regular intervals or attached to the surface thereof, and the deflector steel 200B is embedded in and integrated with the deflector body 31 of the deflector 30 or attached to the surface thereof.

Therefore, the permanent magnet 200A and the deflector steel 200B can form an attraction with the deflector steel 200B with a magnetic force of the permanent magnet 200A when the deflector 30 is switched from the state where the deflector is unfolded to the state where the deflector is folded, thereby maintaining the state where the deflector body 31 and the cover body 21 are in close contact with each other.

Therefore, the anti-sagging device 200 prevents sagging due to the speed bump in the low-speed section, etc.

Figure 9:
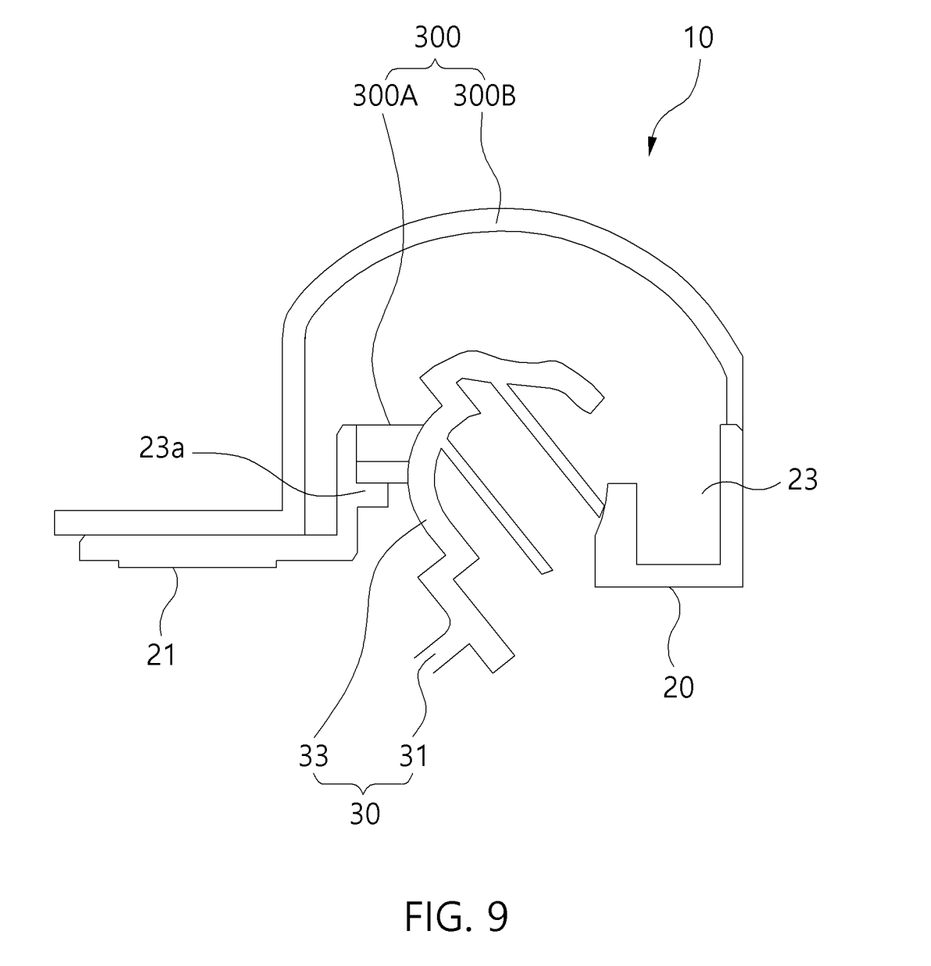
FIG. 9 is a diagram showing an example in which a pollutant blocking structure is applied to the link mechanism type variable wheel deflector according to the present disclosure.

Referring to FIG. 9, the pollutant blocking structure is implemented as a pollutant blocking device 300, and the pollutant blocking device 300 is composed of a protective cover 300A and a brush 300B.

For example, the protective cover 300A is coupled to the cover body 21 of the cover plate 20 to cover the deflector channel 23, and the brush 300B is fixed to a channel step 23a using the partition wall of the deflector channel 23 to be in contact with the hinge body 33 of the deflector 30 located on the deflector channel 23.

Therefore, in the state where the protective cover 300A provides the antifouling property for the deflector channel 23, the brush 300B removes foreign substances attached to the hinge body 33 while the deflector 30 is unfolded at 0 to 90°.

Therefore, the pollutant blocking device 300 prevents the pollutants from flowing and implements the internal protection.

Figure 10:
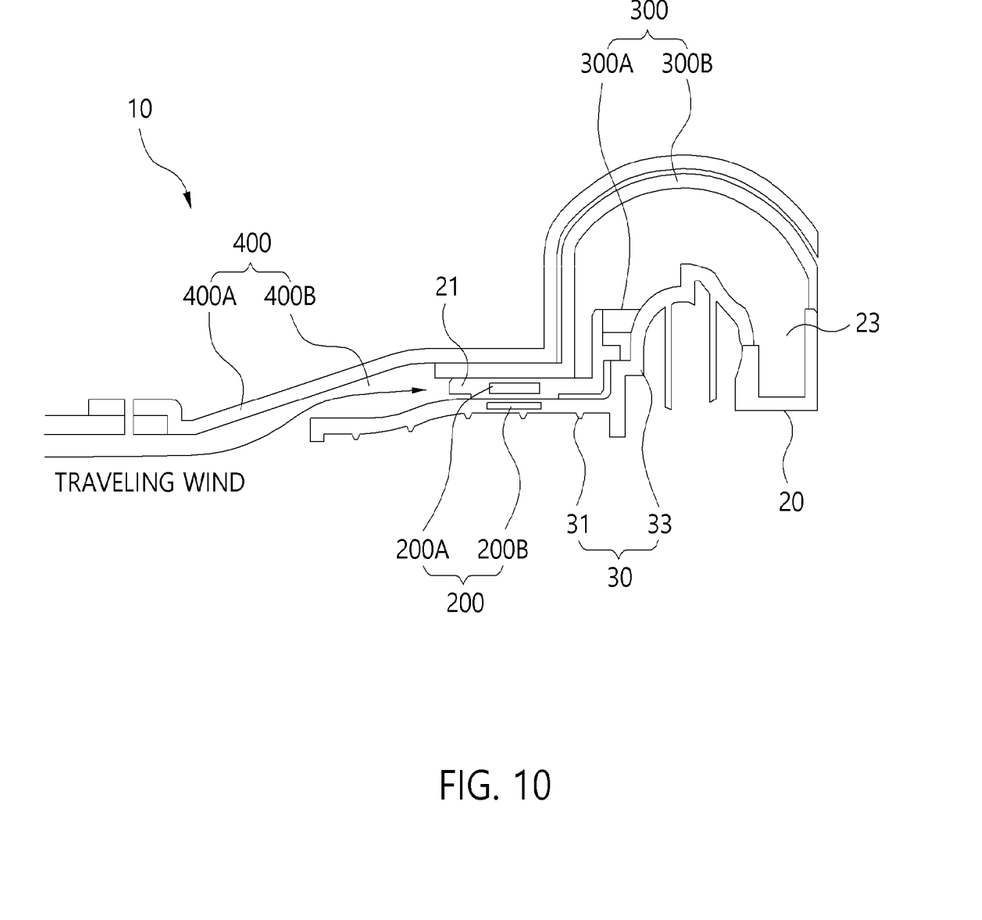
FIG. 10 is a diagram showing an example in which a traveling wind induction structure is applied to the link mechanism type variable wheel deflector according to the present disclosure.

Referring to FIG. 10, the traveling wind induction structure is implemented as a traveling wind induction apparatus 400, and the traveling wind induction apparatus 400 is composed of an undercover 400A and a traveling wind gap 400B.

For example, the undercover 400A is added to the lower portion of the vehicle on the vehicle front part 3 of the vehicle 1 and coupled to the cover body 21 of the cover plate 20 to cover the deflector channel 23, and the traveling wind gap 400B is formed as a gap between the undercover 400A and the cover body 21 of the cover plate 20.

In particular, the undercover 400A can be coupled to surround the protective cover 300A of the pollutant blocking device 300, and the protective cover 300A and the brush 300B of the anti-sagging device 200 can be applied to the cover body 21 and the deflector body 31.

Therefore, the traveling wind induction apparatus 400 can secure the traveling wind gap 400B formed between the deflector 30 and the undercover 400A even if the deflector 30 does not have a separate bending shape, and unfold the deflector 30 with the traveling resistant wind of the air introduced through the traveling wind gap 400B.

As described above, one or more of the shock absorbing device 100, the anti-sagging device 200, the pollutant blocking device 300, and the traveling wind induction apparatus 400 can be applied to the link mechanism type variable wheel deflector 10 together, thereby achieving the intended effects with the synergy effect of each function.

As described above, according to the link mechanism type variable wheel deflector 10 applied to the vehicle 1 according to the present exemplary embodiment, the deflector 30 coupled to the cover plate 20 using the hinge boss 35 as the rotation center can be operated using the traveling resistant wind as the driving source, the piston 63 receiving the linear movement of the link shaft 53 by the moment arm 51 rotated with the deflector 30 can unfold the deflector 30 while compressing the elastic member 65, and the elastic restoring force of the elastic member 65 can be applied to the piston 63 to return the link shaft 53 and the moment arm 51 to fold the deflector 30, thereby strengthening the repeated durability of the elastic member 65 compared to the rotating motion of the spring, and in particular, the rotating motion and the linear motion can be implemented by the link motion mechanism apparatus 40 connected to the deflector 30, thereby implementing the high durability performance with the low-cost mechanical structure.

While a number of exemplary aspects and embodiments have been discussed above, those of skill in the art will recognize that still further modifications, permutations, additions and sub-combinations thereof of the features of the disclosed embodiments are still possible. It is therefore intended that the following appended claims and claims hereafter introduced are interpreted to include all such modifications, permutations, additions and sub-combinations as are within their true spirit and scope.

The invention claimed is:

1. A link mechanism type variable wheel deflector comprising:
   a cover plate;
   a deflector coupled to the cover plate including a hinge boss as a rotation center; and
   a link mechanism apparatus configured to convert a rotating motion in one side direction generated by unfolding the deflector by traveling resistant wind into a linear motion moving forward to store an elastic restoring force of an elastic member, and to convert the linear motion moving backward generated by the elastic restoring force larger than the traveling resistant wind into the rotating motion in an other side direction to fold the deflector to be in contact with the cover plate.

2. The wheel deflector of claim 1,
   wherein the rotating motion in the one side direction forms a state where the deflector is perpendicular to the cover plate, and
   wherein the rotating motion in the other side direction forms a state where the deflector is horizontal to the cover plate.

3. The wheel deflector of claim 1,
   wherein the link mechanism apparatus is composed of a rotating motion link and a linear motion link,
   wherein the rotating motion link is composed of a moment arm formed on a hinge body of the deflector to generate the rotating motion, and a link shaft moving together the moment arm, and
   wherein the linear motion link is composed of a cylinder case in which a piston connected to the link shaft to generate the linear motion is embedded with the elastic member.

4. The wheel deflector of claim 3,
   wherein the moment arm is formed with a long hole through which the link shaft penetrates, and
   wherein a length of the long hole forms a linear movement distance of the piston connected to the link shaft.

5. The wheel deflector of claim 3, wherein a plurality of the moment arms are formed along a width of the hinge body.

6. The wheel deflector of claim 3, wherein the cylinder case is coupled to a case boss of the cover plate.

7. The wheel deflector of claim 3, wherein the cylinder case is formed in a hollow structure, and wherein the hollow structure constrains the movement of the elastic member and the piston.

8. The wheel deflector or claim 3, wherein the elastic member is a compressing spring.

9. The wheel deflector of claim 3,
   wherein the linear motion link is composed of a left linear motion link and a right linear motion link,
   wherein the left linear motion link supports a left portion of the deflector on a left portion of the cover plate, and
   wherein the right linear motion link supports a right portion of the deflector on a right portion of the cover plate.

10. The wheel deflector of claim 1,
    wherein the cover plate locates a hinge body of the deflector on a deflector channel, and
    wherein the deflector channel forms the rotation center with a hinge groove into which the hinge boss is fitted.

11. The wheel deflector of claim 1, wherein the cover plate and the deflector comprise:
    a shock absorbing device; and
    wherein the shock absorbing device is composed of a rubber bumper coupled to a cover body of the cover plate or a rotating damper coupled to the hinge boss of the deflector.

12. The wheel deflector of claim 1, wherein the cover plate and the deflector comprise:
    an anti-sagging device; and
    wherein the anti-sagging device is composed of a permanent magnet coupled to a cover body of the cover plate and a deflector steel coupled to the deflector body of the deflector.

13. The wheel deflector of claim 1, wherein the cover plate comprises:
    a pollutant blocking device; and
    wherein the pollutant blocking device is composed of a protective cover coupled to a cover body of the cover plate, and covering a deflector channel of the cover plate, and a brush fixed to a channel step of the deflector channel, and contacting a hinge body of the deflector.

14. The wheel deflector of claim 1, wherein the cover plate comprises:
    a traveling wind induction device; and
    wherein the traveling wind induction device is composed of an undercover coupled to a cover body of the cover plate and a traveling wind gap formed by the cover body of the cover plate and the undercover to introduce traveling wind.

15. A vehicle comprising:
    a wheel deflector configured to operate a deflector coupled to a cover plate using a hinge boss as a rotation center using traveling resistant wind as a driving source, the wheel deflector further being configured to unfold the deflector while compressing an elastic member of a piston receiving a linear movement of a link shaft by a moment arm rotated with the deflector, and the wheel deflector further being configured to fold the deflector by applying an elastic restoring force of the elastic member to the piston to return the link shaft and the moment arm; and
    a vehicle front part mounted with the wheel deflector.

16. The vehicle of claim 15, wherein the wheel deflector comprises:
one or more of a shock absorbing device configured to prevent the deflector from receiving an operational shock, an anti-sagging device configured to prevent the deflector from being sagged in a non-operation state, a pollutant blocking device configured to prevent the deflector from being polluted by foreign substances, and a traveling wind induction device configured to induce traveling wind to the deflector.

17. The vehicle of claim 16, wherein the deflector comprises a shock absorbing device, and wherein the shock absorbing device is composed of a rubber bumper provided on the cover plate or a rotating damper provided on the rotation center.

18. The vehicle of claim 16, wherein the deflector comprises an anti-sagging device, and wherein the anti-sagging device is composed of a permanent magnet provided on the cover plate and a deflector steel provided on the deflector to form an attraction.

19. The vehicle of claim 16, wherein the deflector comprises a pollutant blocking device, and wherein the pollutant blocking device is composed of a protective cover coupled to the cover plate and a brush contacting the deflector on the rotation center.

20. The vehicle of claim 16, wherein the deflector comprises a traveling wind induction device, and wherein the traveling wind induction device is composed of an undercover forming a traveling wind gap into which the traveling wind flows with the cover plate.

* * * * *